US010775271B2

(12) United States Patent
Worden et al.

(10) Patent No.: US 10,775,271 B2
(45) Date of Patent: Sep. 15, 2020

(54) SYSTEM FOR DETERMINING CONICITY OF A WHEEL BASED ON MEASURED VIBRATIONS

(71) Applicant: General Electric Company, Schenectady, NY (US)

(72) Inventors: Bret Worden, Erie, PA (US); Jingjun Zhang, Lawrence Park, PA (US); David Petersen, Erie, PA (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 215 days.

(21) Appl. No.: 15/370,749

(22) Filed: Dec. 6, 2016

(65) Prior Publication Data

US 2017/0084094 A1 Mar. 23, 2017

Related U.S. Application Data

(63) Continuation-in-part of application No. 14/866,320, filed on Sep. 25, 2015, now Pat. No. 10,018,613, and
(Continued)

(51) Int. Cl.
*G01M 17/013* (2006.01)
*G07C 5/08* (2006.01)
(Continued)

(52) U.S. Cl.
CPC .......... *G01M 17/013* (2013.01); *G01M 15/12* (2013.01); *G01N 29/14* (2013.01);
(Continued)

(58) Field of Classification Search
CPC ..... G01M 13/045; G01M 13/05; G01M 13/12
See application file for complete search history.

(56) References Cited

U.S. PATENT DOCUMENTS 6,212,944 B1 * 4/2001 Kwun ................... G01L 23/223
73/116.02
7,945,397 B2 5/2011 Kar
(Continued)

FOREIGN PATENT DOCUMENTS

CN  102639383  8/2012
CN  104344938  2/2015
(Continued)

OTHER PUBLICATIONS

Copy of Extended European Search Report and Opinion issued in connection with corresponding EP Application No. 16203509.1 dated Sep. 7, 2017.
(Continued)

*Primary Examiner* — Nathaniel J Kolb
(74) *Attorney, Agent, or Firm* — Joseph M. Butscher; The Small Patent Law Group LLC

(57) ABSTRACT

A sensor system includes one or more sensors that sense vibrations of a vehicle and one or more processors that can determine a speed of the vehicle and determine whether the vibrations occurring at one or more frequencies of interest (that are based on the speed of the vehicle) indicate damage to a propulsion system of the vehicle. The one or more processors optionally may determine a hunting frequency of a wheel and axle set and/or a lateral acceleration of the wheel and axle set from the vibrations. The one or more processors can determine a conicity of a wheel in the wheel and axle set based on the hunting frequency and/or the lateral acceleration that is determined.

20 Claims, 9 Drawing Sheets

Related U.S. Application Data a continuation-in-part of application No. 14/869,038, filed on Aug. 29, 2015, now Pat. No. 10,598,650, and a continuation-in-part of application No. 14/421,245, filed as application No. PCT/US2013/055983 on Aug. 21, 2013, now Pat. No. 9,746,452.

(60) Provisional application No. 62/269,265, filed on Dec. 18, 2015, provisional application No. 62/269,304, filed on Dec. 18, 2015, provisional application No. 61/692,230, filed on Aug. 22, 2012.

(51) Int. Cl.
| | | |
|---|---|---|
| *G07C 5/00* | (2006.01) | |
| *G01M 15/12* | (2006.01) | |
| *G01N 29/14* | (2006.01) | |
| *G01N 29/44* | (2006.01) | |
| *G01N 29/46* | (2006.01) | |

(52) U.S. Cl.
CPC ......... *G01N 29/4454* (2013.01); *G01N 29/46* (2013.01); *G07C 5/008* (2013.01); *G07C 5/0808* (2013.01); *G01N 2291/0258* (2013.01)

(56) References Cited

U.S. PATENT DOCUMENTS

| | | | | |
|---|---|---|---|---|
| 8,831,860 | B2* | 9/2014 | Carratt | G01M 15/12 701/111 |
| 8,935,038 | B2 | 1/2015 | Chinnadurai | |
| 8,958,995 | B2* | 2/2015 | Kar | G01K 13/08 702/36 |
| 9,080,925 | B2* | 7/2015 | Schwab | G06F 30/17 |
| 9,218,698 | B2 | 12/2015 | Ricci | |
| 9,317,983 | B2 | 4/2016 | Ricci | |
| 2004/0260454 | A1* | 12/2004 | Basir | G01M 15/05 701/111 |
| 2007/0272023 | A1 | 11/2007 | Dwyer et al. | |
| 2010/0256932 | A1* | 10/2010 | Kar | G01M 13/021 702/56 |
| 2011/0224922 | A1* | 9/2011 | Kirillov | G01M 15/12 702/56 |
| 2011/0231039 | A1 | 9/2011 | Leitel et al. | |
| 2012/0259487 | A1* | 10/2012 | Friesen | B61F 5/245 701/20 |
| 2013/0298642 | A1* | 11/2013 | Gillette, II | G01M 15/102 73/31.01 |
| 2013/0342362 | A1* | 12/2013 | Martin | B60T 13/665 340/870.16 |
| 2014/0107905 | A1* | 4/2014 | Kassner | F02D 41/0007 701/101 |
| 2015/0051792 | A1* | 2/2015 | Kristen | B61L 99/00 701/34.2 |
| 2015/0193992 | A1 | 7/2015 | Kumar et al. | |
| 2015/0308925 | A1* | 10/2015 | Cheung | G01M 15/12 73/114.05 |
| 2016/0018381 | A1 | 1/2016 | Potyrailo et al. | |
| 2016/0018382 | A1 | 1/2016 | Worden et al. | |
| 2016/0144876 | A1 | 5/2016 | Leitel et al. | |

FOREIGN PATENT DOCUMENTS

| | | |
|---|---|---|
| DE | 10 2009 020428 A1 | 5/2010 |
| DE | 2012220660 | 5/2014 |
| EP | 1612458 | 1/2006 |
| EP | 2837919 | 2/2015 |
| WO | 00/55583 A1 | 9/2000 |

OTHER PUBLICATIONS

Worden, B. D., Gear Case Health Sensor, GE Application No. 61/692230, filed on Aug. 22, 2012.

Worden, B., et al., Vehicle sensor assembly and method, GE Application No. 62/269265, filed on Dec. 18, 2015.

Extended European Search Report for EP Application No. 19170029.3, dated Nov. 18, 2019, 8 pages.

Examination Report No. 1 for Australian App. No. 2016273954. dated Dec. 9, 2019.

First Office Action for CN 201611167746.7, dated Oct. 11, 2019 (and English translation).

Examination Report No. 2 dated Jun. 9, 2020 for Australian App. No. 2016273954.

Second Office Action dated Jul. 6, 2020 for corresponding Chinese Invention Patent Application No. 2016111677467.

English translationf of the Second Office Action dated Jul. 6, 2020 for corresponding Chinese Invention Patent Application No. 2016111677467.

Communication of a notice of opposition for EP 162035309.1-1206/3181428, dated Jun. 4, 2020.

English translation of opposition brief included in notice of opposition for EP 162035309.1-1206/3181428.

NREL Technical Report, S. Sheng. et al, "Wind Turbine Drivetraing Condition Monitoring During GRC Phase 1 and Phase 2 Testing," Oct. 2011.

\* cited by examiner

SYSTEM FOR DETERMINING CONICITY OF A WHEEL BASED ON MEASURED VIBRATIONS

CROSS-REFERENCE TO RELATED APPLICATIONS

This application claims priority to U.S. Provisional Application No. 62/269,304 (filed 18 Dec. 2015) and to U.S. Provisional Patent Application No. 62/269,265 (filed 18 Dec. 2015), and is a continuation-in-part of U.S. patent application Ser. No. 14/421,245 (filed 12 Feb. 2015), Ser. No. 14/866,320 (filed 25 Sep. 2015), and Ser. No. 14/869,038 (filed 29 Sep. 2015).

U.S. patent application Ser. No. 14/421,245 is a National Phase application of International Application No. PCT/US2013/055983 filed 21 Aug. 2013 (now expired), which claimed priority to U.S. Provisional Application No. 61/692,230 filed 22 Aug. 2012.

The entire disclosures of these applications are incorporated herein by reference.

FIELD

The subject matter described herein relates to systems and methods that use process information (e.g., data) provided by sensors, such as sensor disposed onboard vehicles.

BACKGROUND

Various systems can include sensors for monitoring characteristics of the systems and/or surroundings of the systems. For example, vehicle systems, stationary power systems, etc., can include several sensors monitoring the same or different characteristics. These sensors can monitor vibrations, temperatures, states, or the like, of the systems in order to track operation of the systems, identify unsafe conditions, determine when maintenance or repair of the systems are needed, or to achieve other objectives. The data provided by the sensors may be used for one or more purposes to control operation and/or monitor health of the vehicles.

BRIEF DESCRIPTION

In one embodiment, a system (e.g., a signal processing system) includes one or more sensors configured to sense vibrations of a vehicle, and one or more processors configured to determine an operational speed of the vehicle and one or more frequencies of interest based on the operational speed of the vehicle. The one or more processors also are configured to determine whether the vibrations occurring at the one or more frequencies of interest indicate damage to a propulsion system of the vehicle.

In one embodiment, a system includes one or more sensors configured to measure vibrations of a vehicle, and one or more processors configured to determine a moving speed of the vehicle along a route. The one or more processors also are configured to determine one or more of a hunting frequency or a lateral acceleration of a wheel and axle set from the vibrations. The one or more processors are configured to determine a conicity of a wheel in the wheel and axle set based on the one or more of the hunting frequency or the lateral acceleration that is determined.

In one embodiment, a method includes sensing vibrations of a vehicle using at least one sensor, determining an operational speed of the vehicle and one or more frequencies of interest based on the operational speed of the vehicle, and determining that the vibrations occurring at the one or more frequencies of interest indicate damage to a propulsion system of the vehicle.

In one embodiment, a system (e.g., a sensor system) includes one or more sensors configured to sense vibrations of a vehicle and one or more processors configured to determine a speed of the vehicle and determine whether the vibrations occurring at one or more frequencies of interest that are based on the speed of the vehicle indicate damage to a propulsion system of the vehicle.

In one embodiment, a system (e.g., a sensor system) includes one or more sensors configured to measure vibrations of a vehicle using one or more sensors and one or more processors configured to determine a moving speed of the vehicle along the route, determine one or more of a hunting frequency of a wheel and axle set or a lateral acceleration of the wheel and axle set from the vibrations, and determine a conicity of a wheel in the wheel and axle set based on the one or more of the hunting frequency or the lateral acceleration that is determined.

In one embodiment, a method (e.g., for monitoring vibrations of a vehicle) includes sensing vibrations of a vehicle using a sensor, determining a speed of the vehicle, and determining whether the vibrations occurring at one or more frequencies of interest that are based on the speed of the vehicle indicate damage to a propulsion system of the vehicle.

In one embodiment, a method (e.g., for monitoring vibrations of a vehicle) includes measuring vibrations of a vehicle using one or more sensors, determining a moving speed of the vehicle along the route, determining one or more of a hunting frequency of a wheel and axle set or a lateral acceleration of the wheel and axle set from the vibrations, and determining a conicity of a wheel in the wheel and axle set based on the one or more of the hunting frequency or the lateral acceleration that is determined.

In one embodiment, a method (e.g., for monitoring vibrations of a vehicle) includes measuring vibrations of a drive train of a vehicle using a sensor, determining one or more frequencies at which one or more peaks occur in a frequency domain spectra of the vibrations that are measured, and determining a speed at which a wheel of the vehicle rotates based on the one or more frequencies that are determined.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
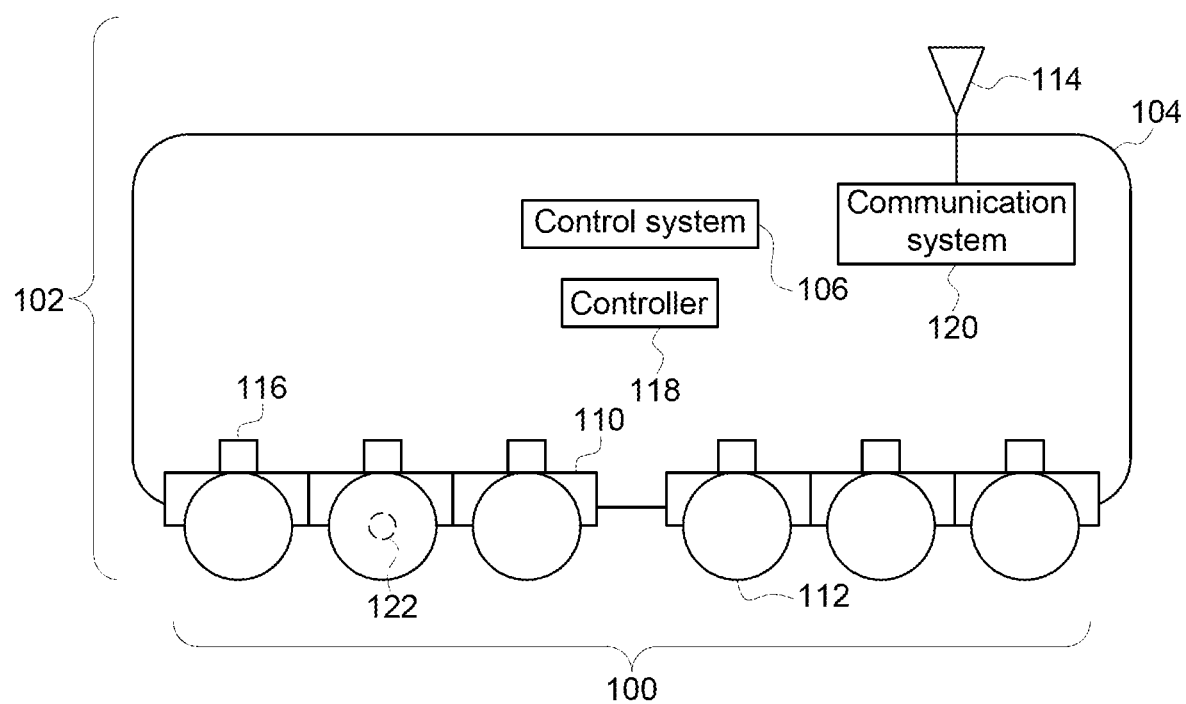
FIG. 1 illustrates a sensor system onboard a vehicle system according to one embodiment.

Reference will be made below in detail to example embodiments of the inventive subject matter, examples of which are illustrated in the accompanying drawings. Wherever possible, the same reference numerals used throughout the drawings refer to the same or like parts. Although embodiments of the inventive subject matter are described with respect to vehicle systems such as trains, locomotives, and other rail vehicles, embodiments of the inventive subject matter are also applicable for use with vehicles generally, such as off-highway vehicles (e.g., vehicles that are not designed or permitted to travel on public roadways), agricultural vehicles, and/or transportation vehicles, each of which may include a vehicle consist. A vehicle system may be formed from two or more vehicles that communicate with each other to coordinate travel of the vehicle system, but that are not mechanically linked with each other. For example, a vehicle system may include two or more vehicles that wirelessly communicate with each other so that the different vehicles may change the respective speeds, tractive efforts, braking efforts, and the like, to cause the separate vehicles to travel together as a convoy or other group along the same route. Optionally, one or more embodiments of the systems and methods described herein may be used with other non-vehicular systems, such as stationary powered systems.

FIG. 1 illustrates a sensor system 100 onboard a vehicle system 102 according to one embodiment. The vehicle system 102 shown in FIG. 1 includes a single vehicle 104, but optionally may represent two or more vehicles that travel together along a route. The vehicles may be mechanically coupled with each other to travel together as a vehicle consist or may be mechanically decoupled but communicate with each other to coordinate movements of the vehicles and travel together as a convoy along the route. The vehicle can represent a propulsion-generating vehicle, such as a locomotive, automobile, truck, marine vessel, or the like. Optionally, the vehicle can represent a non-propulsion-generating vehicle, such as a rail car, trailer, barge, or the like.

The components of the vehicle and/or sensor system may be operably connected by one or more wired and/or wireless connections. The vehicle includes a control system 106 that operates to control operations of the vehicle and/or vehicle system. The control system 106 can include or represent hardware circuitry that includes and/or is connected with one or more processors (e.g., microprocessors, field programmable gate arrays, integrated circuits, or other electronic logic-based devices). The control system 106 may receive signals from an input device 108, such as one or more throttles, pedals, buttons, switches, microphones, touchscreen, keyboards, or the like. An operator of the vehicle may actuate the input device to control operations, such as movement, of the vehicle via the control system. In response to receiving the input from the operator, the control system may communicate signals to one or more components of the vehicle or vehicle system to implement the input. For example, the vehicle may include propulsion systems 110 having traction motors, gear boxes, axles 122, wheels 112, etc., that generate tractive effort or torque to rotate the axles and wheels of the vehicle to propel the vehicle system. The control system can communicate signals to the traction motors to control the torque generated by the traction motors, the speed at which the traction motors operate, etc., to control movement of the axles and wheels of the vehicle or vehicle system. In another example, the control system can communicate signals to brakes or other components to control operations of the vehicle or vehicle system.

Although not shown in FIG. 1, the vehicle can include an output device that provides output to an operator of the vehicle or the vehicle system, to an off-board location, or to one or more other components of the vehicle or vehicle system. The output device can represent a display, a touchscreen, a speaker, a wireless transceiver, etc. The output device can receive signals from the control system that direct the output device to present the output to the operator or other location. A communication system 120 represents hardware circuitry that communicates data signals with one or more locations or systems located off-board the vehicle. The communication system can include transceiving circuitry, such as one or more antennas 114, routers, modems, and the like, for communicating data signals.

The sensor system includes several sensors 116. The sensors can represent a variety of devices that monitor characteristics of the vehicle system and/or the environment around the vehicle system. For example, the sensors may include temperature sensors (e.g., sensors that output data representative of temperatures of the vehicles and/or environment, such as hot box detectors, infrared cameras, etc.), vibration sensors (e.g., sensors that output data representative of movement in one or more directions, such as accelerometers), pressure sensors (e.g., sensors that output data representative of fluid pressure, such as air pressure in tires of the vehicles, pressures of oil or other lubricants in gear boxes and/or engines, etc.), fluid sensors (e.g., sensors that output data representative of an oil or other fluid level, or how much fluid, oil or other lubricant is in gear boxes, engines, etc.), positioning sensors (e.g., sensors that output data representative of geographic or other locations, such as a global positioning system receiver), speed sensors (e.g., sensors that output data representative of how rapidly a vehicle is moving, how rapidly a wheel and/or axle is rotating, etc.), acoustic sensors (e.g., sensors that output data representative of sounds, such as microphones), optic sensors (e.g., sensors that output data representative of images and/or videos, such as cameras, infrared detectors), electromagnetic sensors (e.g., sensors that obtain and/or output data using electromagnetic waves, such as radio frequency identification interrogators or tags), etc. While the same reference number 116 is used to identify the sensors, the sensors 116 may represent different types of sensors.

A controller 118 optionally may be included in the sensor system. The controller can represent hardware circuitry that includes and/or is connected with one or more processors (e.g., microprocessors, field programmable gate arrays, integrated circuits, or other electronic logic-based devices) that communicate with the sensors to receive the data from the sensors. The controller may be operably connected with the sensors to operate as a gateway for the sensors to communicate sensed data with the control system. The controller may communicate some or all of the data to the control system. The processing of data or other signals that are provided or output by the sensors as described herein may be performed by the controller, by the control system, and/or a combination of the controller and/or control system. In one embodiment, the controller may be disposed off-board of the vehicle and/or the vehicle system to perform the signal processing.

Figure 2:
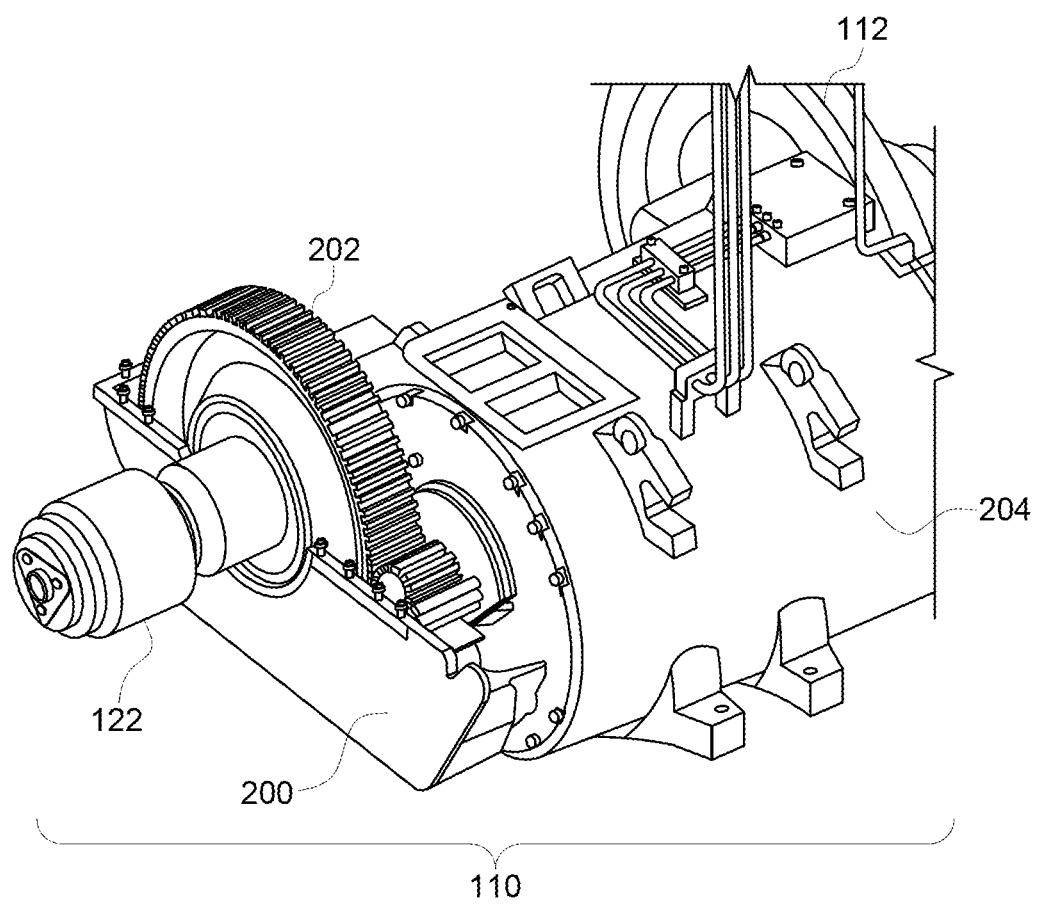
FIG. 2 illustrates one embodiment of a propulsion system in the vehicle shown in FIG. 1.

FIG. 2 illustrates one embodiment of one of the propulsion systems 110 in the vehicle 104 shown in FIG. 1. The propulsion system includes a gear box housing 200 in which one or more gears 202 connect a traction motor 204 with the axle 122. The axle 122 is connected with wheels 112 on opposite ends of the axle 122, although only a single wheel is shown in FIG. 2.

One or more of the sensors onboard the vehicle may sense vibrations. For example, one or more of the sensors may include an accelerometer that measures movements in one or more directions. Such a sensor may be disposed on the gear box housing, traction motor, or elsewhere to measure vibrations. As described herein, the vibrations may be indicative of defects in one or more wheels, damage to the propulsion system (e.g., mechanical failure of axle or motor bearings, lubrication systems, gears, etc.), or the like. In one example, the sensors may include one or more of the sensor assemblies described in U.S. Provisional Application No. 62/269,265, filed 18 Dec. 2015, and titled "Vehicle Sensor Assembly And Method," the entire disclosure of which is incorporated herein by reference.

In one embodiment, the sensors may measure vibrations of wheels and/or axles of the vehicle, and the measured vibrations may be used to identify defects in the wheels. The sensors may include one or more accelerometers coupled with the gear box housing or other component that is directly or indirectly coupled with one or more wheels of the vehicle. During movement, a sensor can measure vibrations. An operational speed of the vehicle can be determined, and the vibrations can be examined at one or more frequencies that are based on the operational speed in order to determine whether a wheel is damaged. As one example, the operational speed at which the wheel is rotating can be determined (e.g., by another sensor, from the control system, etc.), and the vibrations can be examined (e.g., in the frequency domain) at one or more frequencies based on the determined speed in order to determine if the wheel is damaged.

Figure 3:
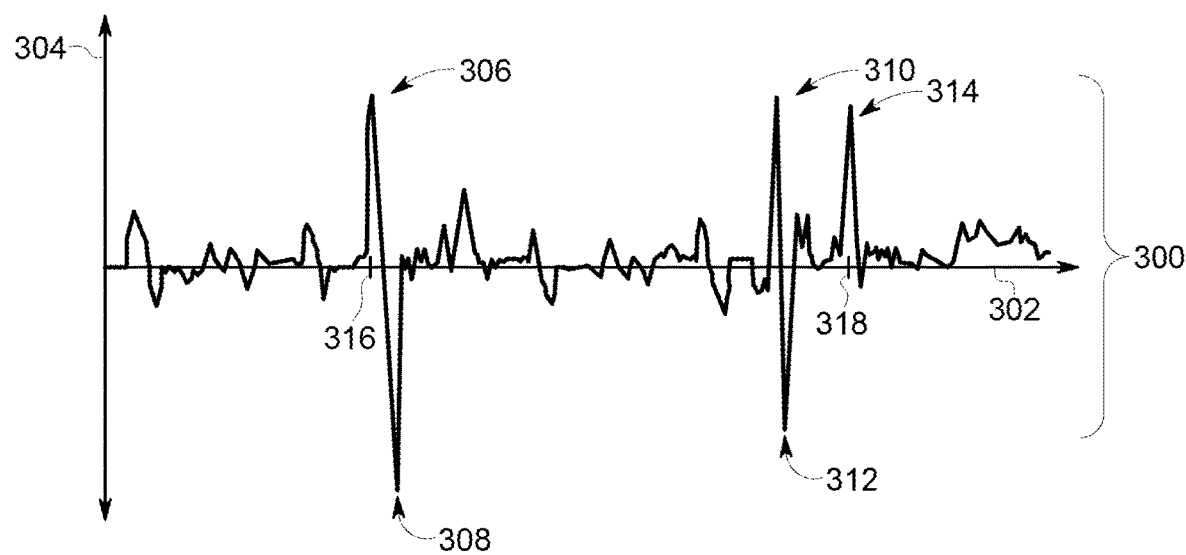
FIG. 3 illustrates vibrations measured by a sensor shown in FIG. 1 according to one example.

FIG. 3 illustrates vibrations 300 measured by a sensor 116 shown in FIG. 1 according to one example. The vibrations 300 are shown in the frequency domain alongside a horizontal axis 302 representative of different frequencies of the vibrations and a vertical axis 304 representative of magnitudes of the vibrations at the corresponding frequencies. The vibrations may be measured by an accelerometer that is connected with the gear box housing, traction motor, or another component that operates to rotate the wheel or wheels being examined. In one aspect, the sensor system may include at least one accelerometer for each gear box housing, wheel, axle, or other component of the vehicle.

The sensor system may determine the speed at which the wheel is being rotated from one or more sources. For example, one or more of the sensors 116 may be a tachometer that generates an output signal representative of the speed at which the wheel or axle is being rotated. As another example, one or more of the sensors 116 may include a current sensor that measures electric current supplied to and/or demanded by the motor to rotate the wheel. The measured current may represent the speed at which the wheel is being rotated. As another example, the wheel rotation speed may be determined based on a measured speed of the vehicle, such as from a global positioning system receiver, a wayside transponder, input from an operator, etc. Alternatively, another type of sensor or source may be used to obtain the speed at which the wheel rotates or information from which the wheel rotation speed may be determined. In one aspect, the rotational speed of the wheel can be determined directly from vibrations measured by one or more of the sensors. For example, the vibrations of a drive train that rotates wheels may be measured by a sensor 116. A frequency domain representation of the vibrations (e.g., a vibration spectra) may include one or more peaks. The frequency or frequencies at which one or more of these peaks occur may correspond with a rotation speed of one or more wheels. For example, the vibrations may represent vibrations caused by rotation of gears in the drive train that mesh with each other to cause rotation of an axle and wheels. The frequency or frequencies at which the peaks representative of the gear meshing occur can represent the rotation speed of the wheel. For faster wheel speeds, the frequency or frequencies of the peaks increase and for slower wheel speeds, the frequency or frequencies decrease.

The wheel rotational speed may be used to determine which frequencies of the vibrations 300 to examine in order to determine whether one or more wheels of the vehicle are damaged. The frequency or frequencies that are determined may be referred to as frequencies of interest. The wheel rotational speed may be converted into a frequency by determining how rapidly the wheel completes a revolution. If the wheel is rotating at a rotational speed of 2000 revolutions per minute, then this speed can represent a frequency of 33.3 Hertz (e.g., 33.3 revolutions per second).

The vibrations at frequencies at or near the frequency representative of the wheel rotational speed can be examined to identify wheel damage. For example, the vibrations occurring at the frequency representative of the wheel rotational speed and vibrations within a designated range of that frequency (e.g., within 1%, 3%, 5%, 10%, or the like, of the frequency) may be examined. The vibrations may be examined to determine whether a peak exists within these vibrations. A peak in the vibrations at or within the designated range of frequencies may indicate that the measured vibrations increase at the same time, such as at the same time during repeated revolution of the wheel. For example, if a peak in the vibrations occurs at or around the frequency representative of how rapidly the wheel is rotating, then that peak may indicate that the vibrations increase when the same segment of the wheel contacts the route during repeated revolutions of the wheel. These increased vibrations may indicate that this segment of the wheel is damaged and that the wheel is potentially in need of repair, inspection, or replacement.

The vibrations 300 include several peaks, some of which are identified as peaks 306, 308, 310, 312, 314. One or more of these peaks may represent or indicate damage to a wheel. The control system and/or controller may determine the speed at which the wheel or wheels are being rotated (e.g., based on the rotational speed of a motor that rotates the axle and wheels), and determine that this speed corresponds to a designated frequency 316. The control system and/or controller may examine the vibrations 300 at the designated frequency 316 and/or within a designated range of frequencies around the designated frequency 316 (e.g., frequencies within 1%, 3%, 5%, 10%, or the like, of the designated frequency 316 above and/or below the designated frequency 316).

During this examination, the control system and/or controller may determine whether one or more peaks or other increased magnitudes of the vibrations 300 are present. In the illustrated example, the peak 306 is at the designated frequency 316 or within a designated range of frequencies around the designated frequency 316. The peak 306 may represent increased vibrations each time the same segment of the outer circumference of the wheel contacts the route being traveled upon. For example, if the wheel includes a flat spot, spalling, cracking, or other damage on the outer circumference of the wheel, then the location of this damage may cause increased vibrations of the wheel each time the location contacts the route. These increased vibrations can be measured by the sensor and used by the control system and/or controller to determine that a wheel is damaged.

Responsive to determining that the wheel is damaged, the control system and/or controller can implement one or more responsive actions. In one embodiment, the control system and/or controller can direct the communication system to communicate a signal to an off-board location. This signal may be sent to an off-board location, such as a repair facility, rail yard, or the like, to automatically schedule or request to schedule repair, inspection, and/or replacement of a wheel identified as damaged based on the measured vibrations. Optionally, this signal may inform the off-board location of the size of wheel needed by the vehicle to replace the damaged wheel. The off-board location may then set aside or otherwise obtain a replacement wheel for the vehicle. In doing so, the vehicle may have a replacement wheel ready for installing on the vehicle upon arrival of the vehicle at the off-board location. Optionally, the control system and/or controller may automatically change how the vehicle is operated, such as by automatically slowing movement of the vehicle, automatically restricting the control settings that an operator may use (e.g., by preventing the operator from increasing the throttle to a fast setting), etc.

The propulsion system of the vehicle includes gears that mesh with each other and that also may vibrate during operation. The vibrations of the meshing gears may be detected by the sensors and communicated to the control system as measured vibrations of the propulsion system. These vibrations may differ from the vibrations caused by travel of a damaged wheel over a route. For example, because the gears may have smaller circumferences than the wheels, the gears may rotate at larger frequencies than the wheels. Consequently, the vibrations caused by meshing gears may occur at greater frequencies than the vibrations concurrently caused by damaged wheels traveling over a route for a traction motor that is rotating both the gears and the wheels.

The control system and/or controller may determine the operational speed of the vehicle as the speed at which the gears are rotating. For example, one or more of the sensors 116 may be a tachometer that generates an output signal representative of the speed at which the wheel or axle is being rotated. As another example, one or more of the sensors 116 may include a current sensor that measures electric current supplied to and/or demanded by the motor to rotate the wheel. The measured current may represent the speed at which the wheel is being rotated. As another example, the wheel rotation speed may be determined based on a measured speed of the vehicle, such as from a global positioning system receiver, a wayside transponder, input from an operator, etc. Alternatively, another type of sensor or source may be used to obtain the speed at which the wheel rotates or information from which the wheel rotation speed may be determined.

The wheel rotational speed may be used to determine which frequencies of the measured vibrations are caused by the gears meshing with each other. For example, the ratio of the circumference of a wheel to the circumference of a gear may be multiplied with the frequency of the vibrations caused by the wheel in order to determine which vibrations are caused by the meshing gears. Alternatively, the frequency or frequencies of vibrations caused by the meshing gears may be empirically determined prior to travel of the vehicle.

The vibrations at frequencies at or near the frequency representative of the gears meshing can be examined to identify damage to the propulsion system. For example, the vibrations occurring at the frequency representative of the gear meshing and vibrations within a designated range of that frequency (e.g., within 1%, 3%, 5%, 10%, or the like, of the frequency) may be examined. The vibrations may be examined to determine whether a peak exists within these vibrations. A peak in the vibrations at or within the designated range of frequencies may indicate that the measured vibrations indicate damage or failure of one or more components of the propulsion system. For example, if a peak in the vibrations occurs at or around the frequency representative of how rapidly the gears in the propulsion system mesh with each other, then that peak may indicate that the vibrations indicate mechanical damage to or failure in bearings (e.g., axle or motor bearings), a lubrication system (e.g., a system that holds and/or moves lubricant through the propulsion system), the gears, or other components of the propulsion system.

With respect to the vibrations 300 shown in FIG. 3, one or more of the peaks may represent or indicate vibrations caused by meshing gears. The control system and/or controller may determine the speed at which the gears are meshing (e.g., based on the rotational speed of the motor that rotates the gears), and determine that this speed corresponds to a designated frequency 318. The control system and/or controller may examine the vibrations 300 at the designated frequency 318 and/or within a designated range of frequencies around the designated frequency 318 (e.g., frequencies within 1%, 3%, 5%, 10%, or the like, of the designated frequency 318 above and/or below the designated frequency 318).

During this examination, the control system and/or controller may determine whether one or more peaks or other increased magnitudes of the vibrations 300 are present. In the illustrated example, the peak 314 is at the designated frequency 318 or within a designated range of frequencies around the designated frequency 318. The peak 314 may represent increased vibrations caused by the meshing gears in the propulsion system. These increased vibrations can be measured by the sensor and used by the control system and/or controller to determine that one or more components of the propulsion system are damaged or have failed.

Responsive to determining that one or more components of the propulsion system are damaged, the control system and/or controller can implement one or more responsive actions. In one embodiment, the control system and/or controller can direct the communication system to communicate a signal to an off-board location. This signal may be sent to an off-board location, such as a repair facility, rail yard, or the like, to automatically schedule or request to schedule repair and/or inspection of the propulsion system. Optionally, the control system and/or controller may automatically change how the vehicle is operated, such as by automatically slowing movement of the vehicle, automatically restricting the control settings that an operator may use (e.g., by preventing the operator from increasing the throttle to a fast setting), etc.

The sensor system optionally may be able to identify wear of a wheel and predict when maintenance, repair, or replacement of the wheel is needed based on vibrations measured by one or more of the sensors. Portions of a wheel may gradually erode over time, which can cause the surface of the wheel that contacts a route to have an uneven shape or surface. This uneven surface can cause the wheel and/or the vehicle to move back-and-forth on the route, or wobble, which can consequently damage the route.

Figure 4:
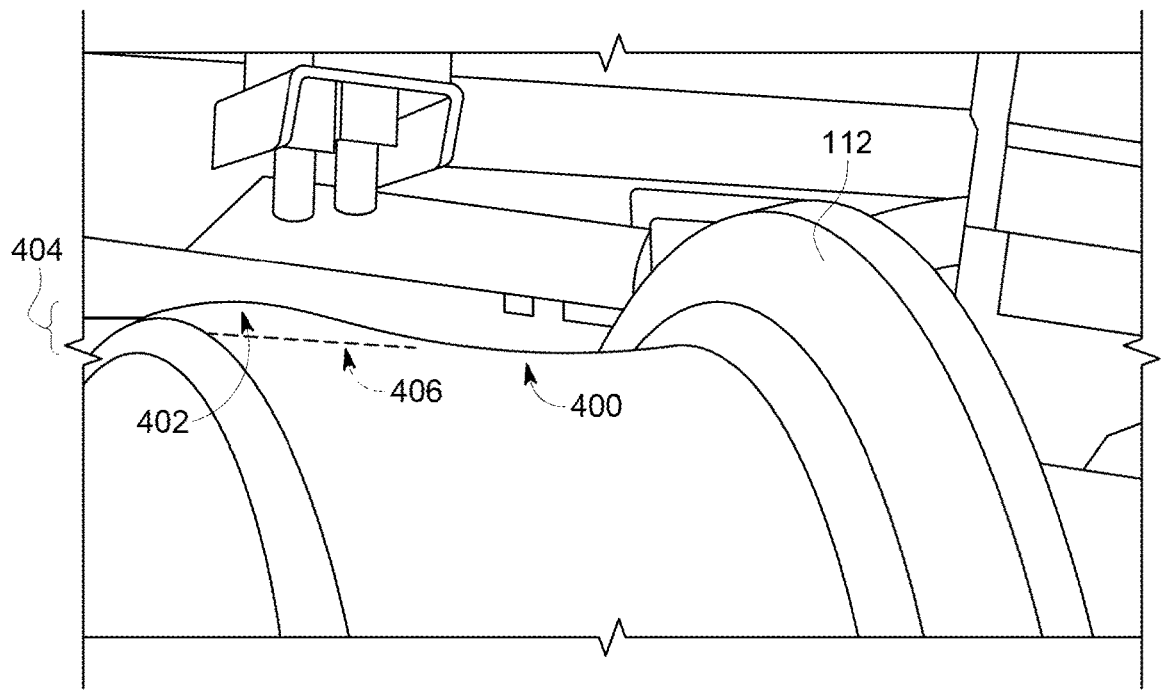
FIG. 4 illustrates a perspective view of an outer surface of a wheel according to one example.

FIG. 4 illustrates a perspective view of an outer surface 400 of a wheel 112 according to one example. The outer surface 400 may be the outer circumference or perimeter of the wheel 112 that contacts the route, such as a rail of a track. The outer surface 400 may have a circular shape along the circumference of the wheel 112 and a flat shape or profile along directions that are parallel to a center axis or axis of rotation of the wheel 112. Over time, however, the wheel 112 may wear unevenly to cause the outer surface 400 to have a shape or profile 402 that is uneven or that is not flat (e.g., in a direction that is parallel to the axis of rotation of the wheel 112). This profile 402 is predominantly flat, but includes a bump or undulation 404 where the wheel 112 has worn down less than in other portions of the wheel 112. As a result, the profile 402 of the wheel 112 is uneven, as shown in FIG. 4. In order to repair the profile 402 of the wheel 112, the bump or undulation 404 may be worn down or otherwise removed from the wheel 112 such that the wheel 112 has a flat shape or profile 406 in directions that are parallel to the axis of rotation of the wheel 112.

Identifying uneven profiles of the wheel 112 can be accomplished via manual inspection, but this can be labor intensive and prone to errors. Failure to identify a wheel 112 that has worn unevenly at an early stage can result in more of the uneven portion of the wheel 112 being removed to achieve an even profile than would have been removed if the uneven profile was identified earlier. Travel of a vehicle on wheels with uneven profiles can reduce performance of the vehicle, as well as damage components of the vehicle due to excessive dynamic loads being imparted on the components due to wobbling of the vehicle. Moreover, wheels having uneven profiles may not adhere to the route as well as wheels having even profiles. This can result in wheel slip and reduced tractive effort of the vehicle.

In one embodiment, vibrations measured by one or more of the sensors 116 can be examined to identify uneven wear of one or more wheels in a vehicle and/or to predict when repair to a wheel is needed (e.g., to change the uneven profile to an even profile.

Figure 5:
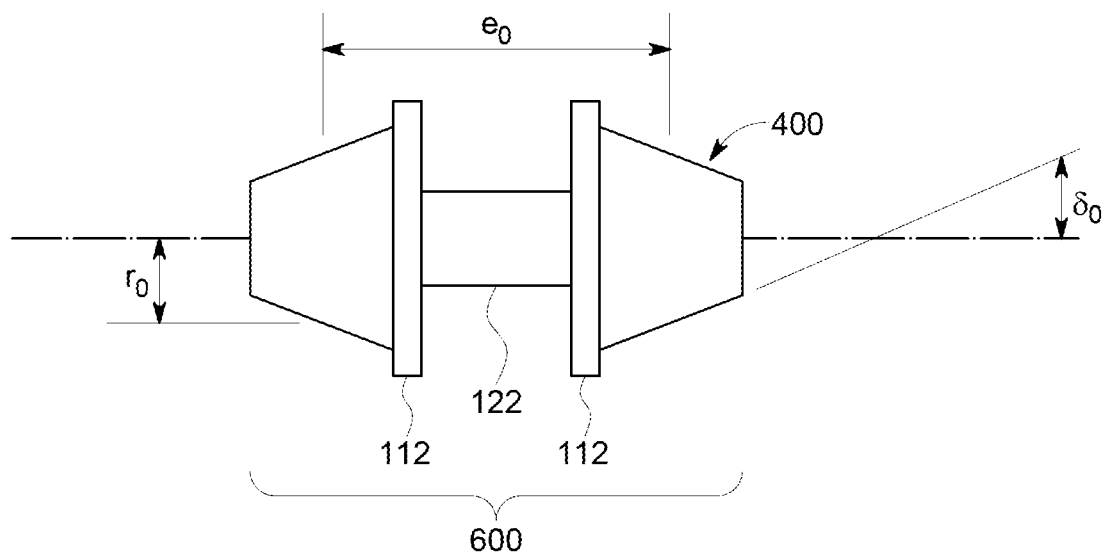
FIG. 5 illustrates a wheel/axle set of the vehicle shown in FIG. 1 according to one embodiment.

FIG. 5 illustrates a wheel/axle set 600 of the vehicle 104 shown in FIG. 1 according to one embodiment. The wheel/axle set 600 includes an axle 122 that joins two wheels 112. The uneven profile 402 of a wheel 112 can be characterized by a wheel conicity ($\delta_0$), which represents an angle between the actual profile or surface 400 of the wheel 112 and a flat profile or surface of the wheel 112, or the angle between the actual profile or surface 602 of the wheel 112 and an axis of rotation 604 of the wheel 112. Wheels 112 with larger conicities may have surfaces that are more uneven while wheels 112 with smaller conicities may have more even surfaces. A contact distance ($e_0$) represents the lateral distance between locations where each wheel 112 contacts the route, such as where the wheels 112 contact different rails. The wheels 112 have radii ($r_0$) representative of distances from the axis of rotation of the wheels 112 and the surfaces 400 of the wheels 112.

Figure 6:
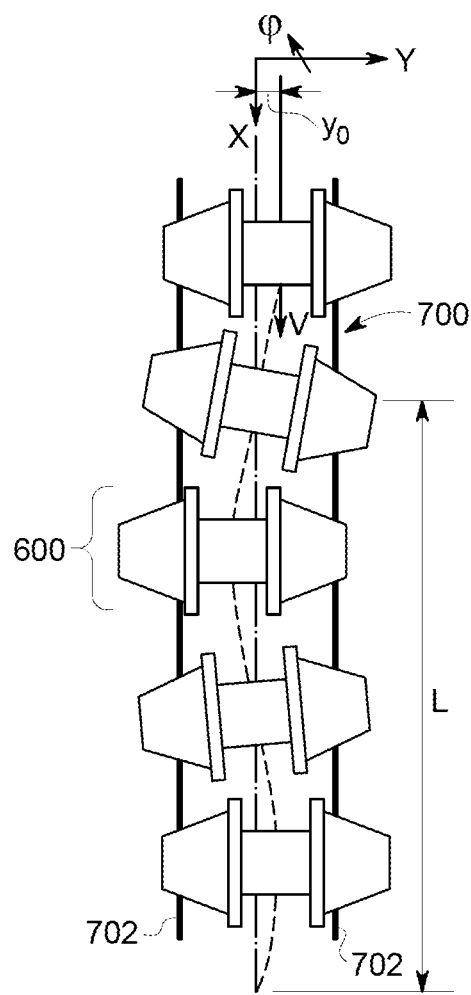
FIG. 6 illustrates a hunting movement of the wheel/axle set shown in FIG. 5 according to one example.

FIG. 6 illustrates a hunting movement of the wheel/axle set 600 shown in FIG. 5 according to one example. The wheel/axle set 600 is shown in FIG. 6 as moving back-and-forth, or wobbling or hunting, during movement along a route 700 formed from parallel rails 702. The conicities of one or more of the wheels 112 in the wheel/axle set 600 causes the hunting movement of the wheel/axle set 600. The wheel/axle set 600 may hunt, or wobble, back-and-forth relative to the route 700 at a hunting frequency ($\omega$). A hunting distance (L) represents how far the wheel/axle set 600 moves along the route 700 for one back-and-forth hunting cycle, as shown in FIG. 6.

The hunting frequencies and/or hunting distances of wheel/axle sets having wheels with various different conicities can be measured or determined. Both the hunting frequency and the hunting distance of a wheel/axle set can be dependent or based on the conicities of the wheels in the wheel/axle set. For example, the hunting frequency can be based on the moving speed of the vehicle or wheel/axle set, the wheel conicity, the contact distance, and the radius of a wheel:

$$\omega = V\sqrt{\frac{\delta_0}{(e_0 r_0)}} \qquad \text{(Equation \#1)}$$

where $\omega$ represents the hunting frequency, V represents the moving speed of the vehicle or wheel/axle set, $\delta_0$ represents the conicity of the wheel (or an average of the conicities of the wheels in the wheel/axle set), $e_0$ represents the contact distance of the wheel/axle set, and $r_0$ represents the radius of the wheel (or an average of the radii of the wheels in the wheel/axle set). The hunting distance can be based on the contact distance of the wheel/axle set, the radius or radii of the wheel or wheels in the wheel/axle set, and the conicities of the wheel or wheels in the wheel/axle set:

$$L = 2\pi\sqrt{\frac{e_0 r_0}{\delta_0}} \qquad \text{(Equation \#2)}$$

where L represents the hunting distance, $\delta_0$ represents the conicity of the wheel (or an average of the conicities of the wheels in the wheel/axle set), $e_0$ represents the contact distance of the wheel/axle set, and $r_0$ represents the radius of the wheel (or an average of the radii of the wheels in the wheel/axle set). As shown in Equations 1 and 2 above, the hunting frequency may increase and the hunting distance may decrease for larger wheel conicities, and the hunting frequency may decrease and the hunting distance may increase for smaller wheel conicities.

Larger wheel conicities may cause increased hunting frequencies and larger lateral accelerations of the wheel/axle set relative to smaller wheel conicities. Increased hunting frequencies and/or larger lateral accelerations of the wheel/axle set can result in increased damage to the wheels, route (e.g., the rails), and/or components of the vehicle relative to smaller hunting frequencies and/or smaller lateral accelerations.

Figure 7:
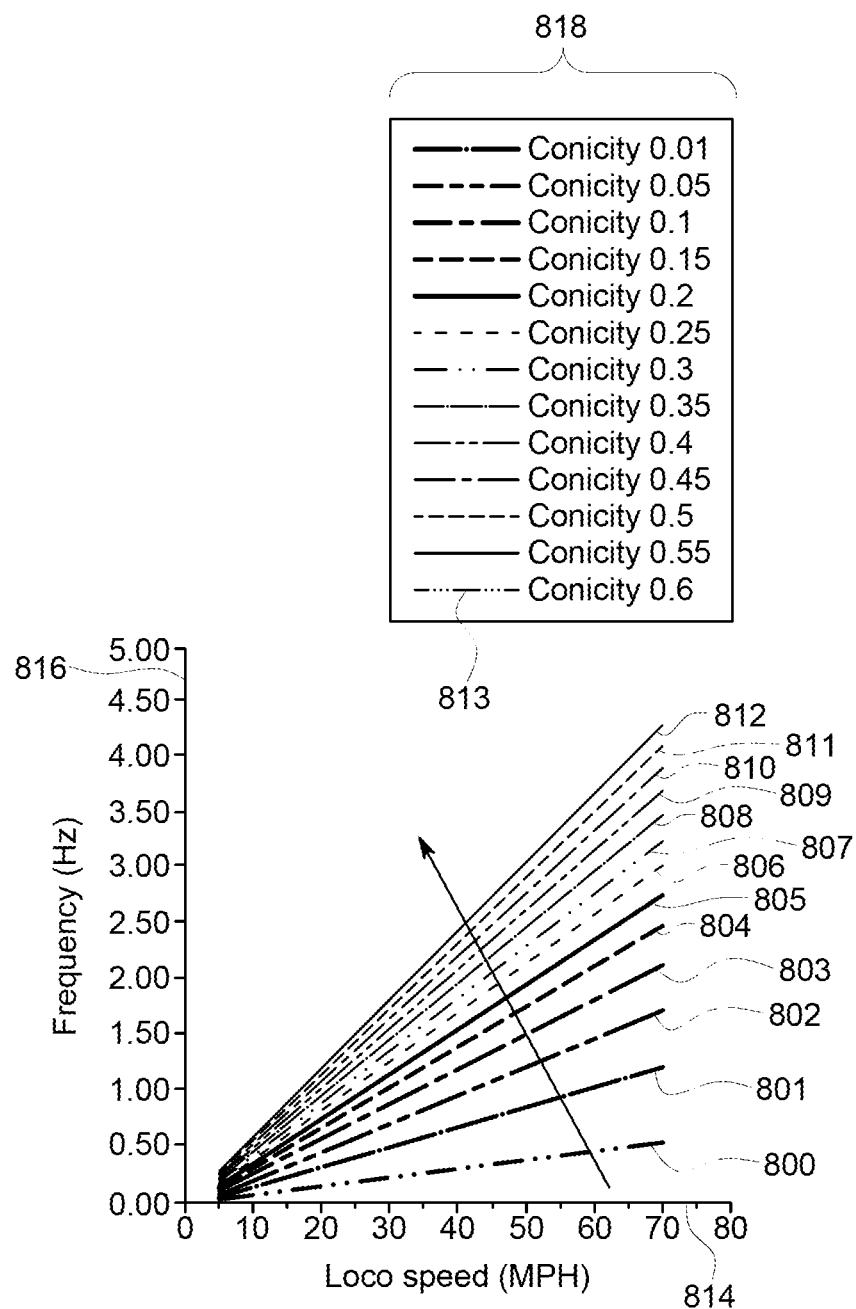
FIG. 7 illustrates relationships between moving speeds of the vehicle or wheel/axle set and hunting frequencies of the wheel/axle set for different wheel conicities.

FIG. 7 illustrates relationships 800-812 between moving speeds of the vehicle or wheel/axle set and hunting frequencies $\omega$ of the wheel/axle set for different wheel conicities. The relationships 800-812 are shown alongside a horizontal axis 814 representative of moving speeds of the vehicle or wheel/axle set along the route and a vertical axis 816 representative of hunting frequencies. The relationships 800-812 correspond to different wheel conicities, as shown in a legend 818 of FIG. 7. As shown in FIG. 7, as wheel conicity increases, the hunting frequencies increase for faster moving speeds of the vehicle or wheel/axle set. As described below, the hunting frequency can be monitored based on vibrations measured by one or more sensors 116 shown in FIG. 1 in order to determine or estimate the wheel conicity of one or more wheels in the vehicle.

Figure 8:
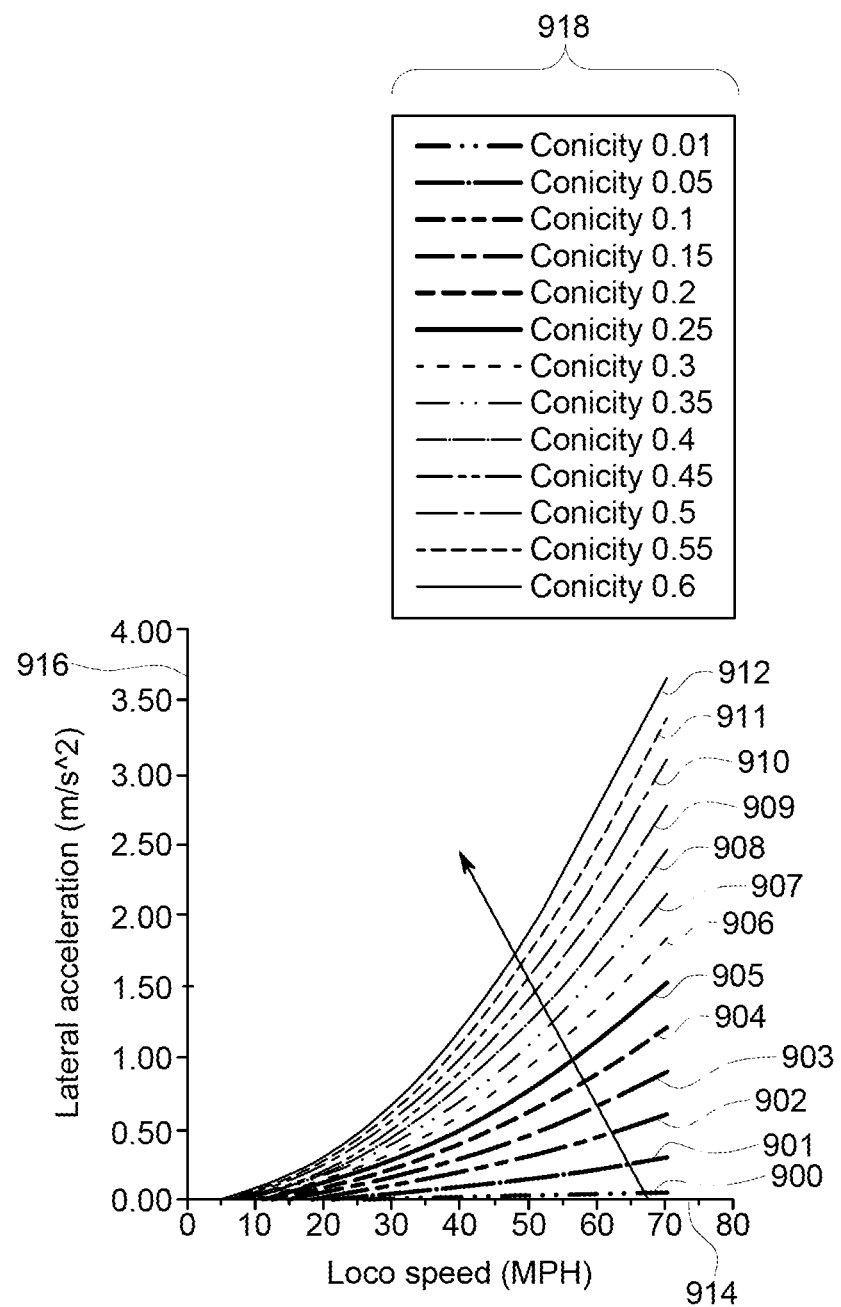
FIG. 8 illustrates relationships between moving speeds of the vehicle or wheel/axle set and lateral accelerations of the wheel/axle set for different wheel conicities.

FIG. 8 illustrates relationships 900-912 between moving speeds of the vehicle or wheel/axle set and lateral accelerations of the wheel/axle set for different wheel conicities. The relationships 900-912 are shown alongside a horizontal axis 914 representative of moving speeds of the vehicle or wheel/axle set along the route and a vertical axis 916 representative of hunting frequencies. The relationships 900-912 correspond to different wheel conicities, as shown in a legend 918 of FIG. 8. As wheel conicity increases, the lateral accelerations increase for faster moving speeds of the vehicle or wheel/axle set. As described below, the magnitude of lateral accelerations can be monitored based on vibrations measured by one or more sensors 116 shown in FIG. 1 in order to determine or estimate the wheel conicity of one or more wheels in the vehicle.

The vibrations of a wheel/axle set can be measured by one or more sensors 116. These vibrations can be sampled continuously, periodically, or on demand by an operator or the control system. The vibrations may be examined in the frequency domain in order to determine if the vibrations indicate the conicity of one or more wheels of the wheel/axle set.

Figure 9:
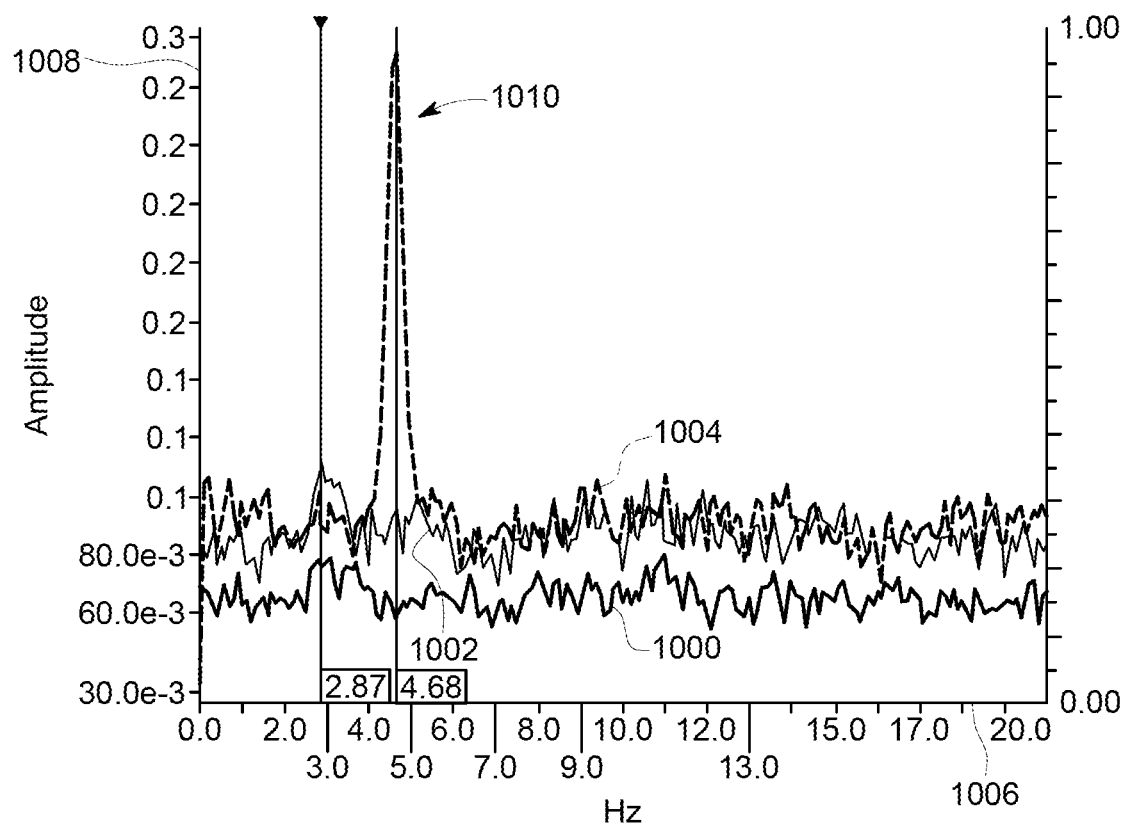
FIG. 9 illustrates vibration signatures of a wheel/axle set of the vehicle according to one example.

FIG. 9 illustrates vibration signatures 1000, 1002, 1004 of a wheel/axle set of the vehicle according to one example. The vibration signatures 1000, 1002, 1004 represents vibrations of the wheel/axle set as measured by one or more sensors 116 over time. For example, each of the vibration signatures 1000, 1002, 1004 can represent average vibrations of the wheel/axle set from vibrations that are sampled over time. The vibrations represented by the different vibration signatures 1000, 1002, 1004 may be vibrations measured at the same or different moving speeds of the vehicle or wheel/axle set.

The vibration signatures 1000, 1002, 1004 are shown alongside a horizontal axis 1006 representative of frequencies and a vertical axis 1008 representative of magnitudes of vibrations. The vibration signatures 1000, 1002, 1004 may represent the vibrations measured at different times. For example, the vibration signature 1000 can represent the vibrations measured within the first four weeks of travel of a wheel/axle set, the vibration signature 1002 can represent the vibrations measured within the next four weeks of travel of the wheel/axle set, and the vibration signature 1004 can represent the vibrations measured within the next four weeks of travel of the wheel/axle set.

As shown in FIG. 9, the vibrations represented by the vibration signatures 1000, 1002, 1004 increase over time. The vibration signature 1000 includes the smallest vibrations in terms of magnitude, with the vibrations in the vibration signature 1002 increasing in magnitude relative to the vibration signature 1000. The vibration signature 1004 includes similar vibrations as the vibration signature 1002, with the addition of a peak vibration 1010 at a frequency of 4.68 hertz. The control system and/or controller can identify the increasing vibrations in the signatures 1000, 1002, 1004 and/or the peak vibration 1010 as indicative of increasing wheel conicity. For example, the control system and/or controller can examine the frequency at which the peak vibration 1010 occurs and determine an estimated wheel conicity based on the frequency of the peak vibration 1010 and the moving speed of the vehicle or wheel/axle set when the peak vibration 1010 occurred. This frequency may be the hunting frequency of the wheel/axle set.

The control system and/or controller can examine relationships between the hunting frequency and moving speeds, such as the relationships 800-812 shown in FIG. 7, to determine the wheel conicity represented by the peak vibration 1010. For example, frequency at which the peak vibration 1010 occurs may be identified as the hunting frequency of the wheel/axle set. One or more of the relationships 800-812 may include the moving speed of the vehicle or wheel/axle set when the peak vibration 1010 occurred and the hunting frequency of the peak vibration 1010. For example, if the moving speed is 50 miles per hour (mph) and the hunting frequency of the peak vibration 1010 is 1.5 hertz, then the relationship 803 may be selected by the control system and/or controller. The wheel conicity associated with the relationship 803 (e.g., in a memory, such as a computer hard drive, flash drive, or the like) may be identified as the wheel conicity of one or more wheels of the wheel/axle set.

The control system and/or controller can examine relationships between the magnitude of the vibrations and the moving speeds, such as the relationships 900-912 shown in FIG. 8, to determine and/or confirm the wheel conicity represented by the peak vibration 1010. For example, magnitude of the peak vibration 1010 may be identified as the lateral acceleration of the wheel/axle set. One or more of the relationships 900-912 may include the moving speed of the vehicle or wheel/axle set when the peak vibration 1010 occurred and the magnitude of the peak vibration 1010. For example, if the moving speed is 65 mph and the magnitude of the peak vibration 1010 is 1 meter per second per second, then the relationship 904 may be selected by the control system and/or controller. The wheel conicity associated with the relationship 904 (e.g., in a memory, such as a computer hard drive, flash drive, or the like) may be identified as the wheel conicity of one or more wheels of the wheel/axle set.

The wheel conicity of one or more wheels of the wheel/axle set may be monitored over time. If the wheel conicity changes (e.g., increases) by more than a designated, non-zero threshold amount, then the control system and/or controller may implement one or more responsive actions. The control system and/or controller can direct the communication system to communicate a signal to an off-board location. This signal may be sent to an off-board location, such as a repair facility, rail yard, or the like, to automatically schedule or request to schedule repair, inspection, and/or replacement of a wheel based on the conicity that is determined. Optionally, this signal may inform the off-board location of the size of wheel needed by the vehicle to replace the wheel. The off-board location may then set aside or otherwise obtain a replacement wheel for the vehicle. In doing so, the vehicle may have a replacement wheel ready for installing on the vehicle upon arrival of the vehicle at the off-board location. Optionally, the control system and/or controller may automatically change how the vehicle is operated, such as by automatically slowing movement of the vehicle, automatically restricting the control settings that an operator may use (e.g., by preventing the operator from increasing the throttle to a fast setting), etc.

By monitoring vibrations of the wheel/axle set using onboard sensors, the conicity of one or more wheels may be monitored during movement of the vehicle, and not only at times when the vehicle is stationary. This can allow for increasing conicity of a wheel to be identified sooner, which can allow for the wheel to be repaired sooner and before significant changes in the profile of the wheel occur.

Figure 10:
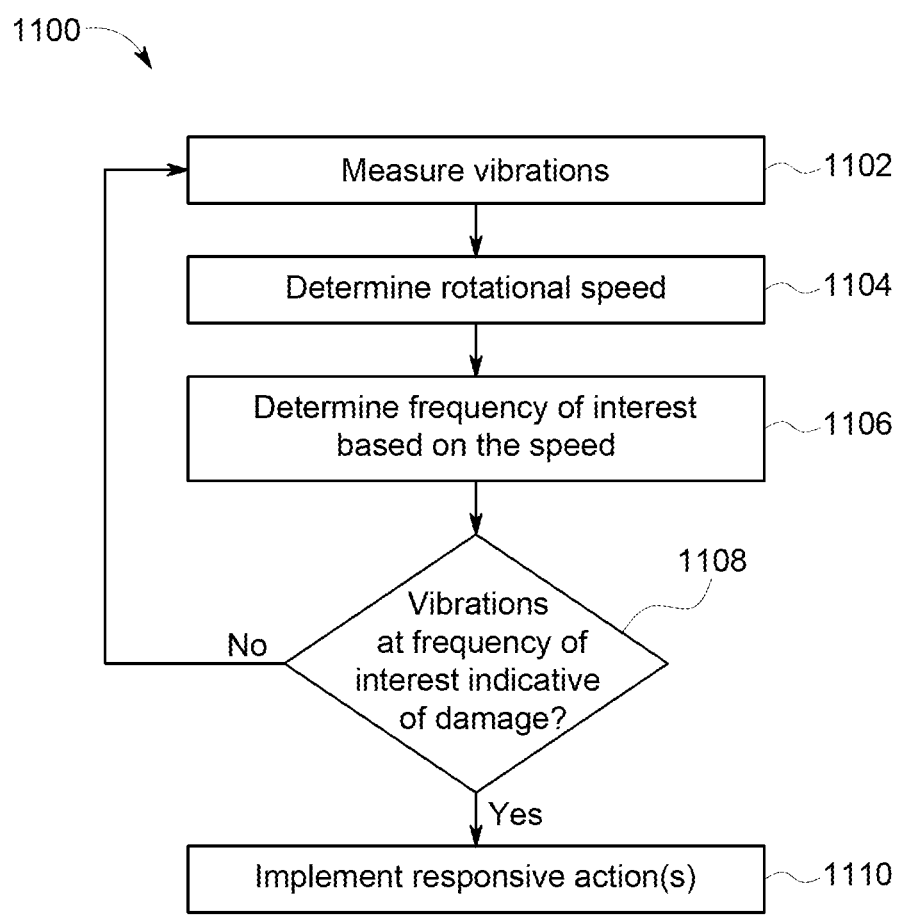
FIG. 10 illustrates a flowchart of one embodiment of a method for monitoring vibrations of a vehicle.

FIG. 10 illustrates a flowchart of one embodiment of a method 1100 for monitoring vibrations of a vehicle. The method 1100 may be performed by one or more embodiments of the sensor systems described herein in order to determine if vibrations of a vehicle indicate damage to a wheel or other component of the vehicle. At 1102, vibrations of the vehicle are measured. The vibrations may be measured by one or more sensors such as accelerometers, which may be connected with a gear case housing or other component of the propulsion system of the vehicle. Alternatively, the sensors may be in other locations.

At 1104, the rotational speed at which the axle and/or wheels of the vehicle are being rotated is determined. The rotational speed may be obtained or determined using a tachometer, a current sensor, a measured speed of a vehicle, etc., as described above. At 1106, one or more frequencies of interest are identified based on the rotational speed that is determined. The rotational speed may be used to determine which frequencies of the vibrations to examine. The rotational speed may be converted into a frequency by determining how rapidly the wheel completes a revolution. If the vibrations are being examined to identify damage to the wheel, then the frequencies of interest may be the frequencies that represent how rapidly the wheel completes a revolution. If the vibrations are being examined to identify damage to another component, such as meshing gears, then the frequencies of interest may be the frequencies that are faster than the frequencies that represent how rapidly the wheel completes a revolution.

At 1108, the vibrations at the frequency or frequencies of interest are examined in order to identify damage to the vehicle. For example, if the vibrations at the frequency or frequencies of interest have larger magnitudes than at other frequencies, the vibrations at the frequency or frequencies of interest may indicate damage to a wheel or other component of the vehicle (e.g., gears, bearings, etc.), as described above. If the vibrations do indicate damage, then flow of the method 1100 may proceed toward 1110. Otherwise, flow of the method 1100 can return toward 1102.

At 1110, one or more responsive actions are implemented. For example, a signal may be communicated to an off-board location, such as a repair facility, rail yard, or the like, to automatically schedule or request to schedule repair, inspection, and/or replacement of a wheel and/or other component identified as damaged based on the measured vibrations. Optionally, this signal may inform the off-board location of the wheel or component needed by the vehicle to replace the damaged wheel or other component. The off-board location may then set aside or otherwise obtain a replacement wheel or component for the vehicle. Optionally, control of the vehicle may be modified, such as by automatically slowing movement of the vehicle, automatically restricting the control settings that an operator may use (e.g., by preventing the operator from increasing the throttle to a fast setting), etc.

Figure 11:
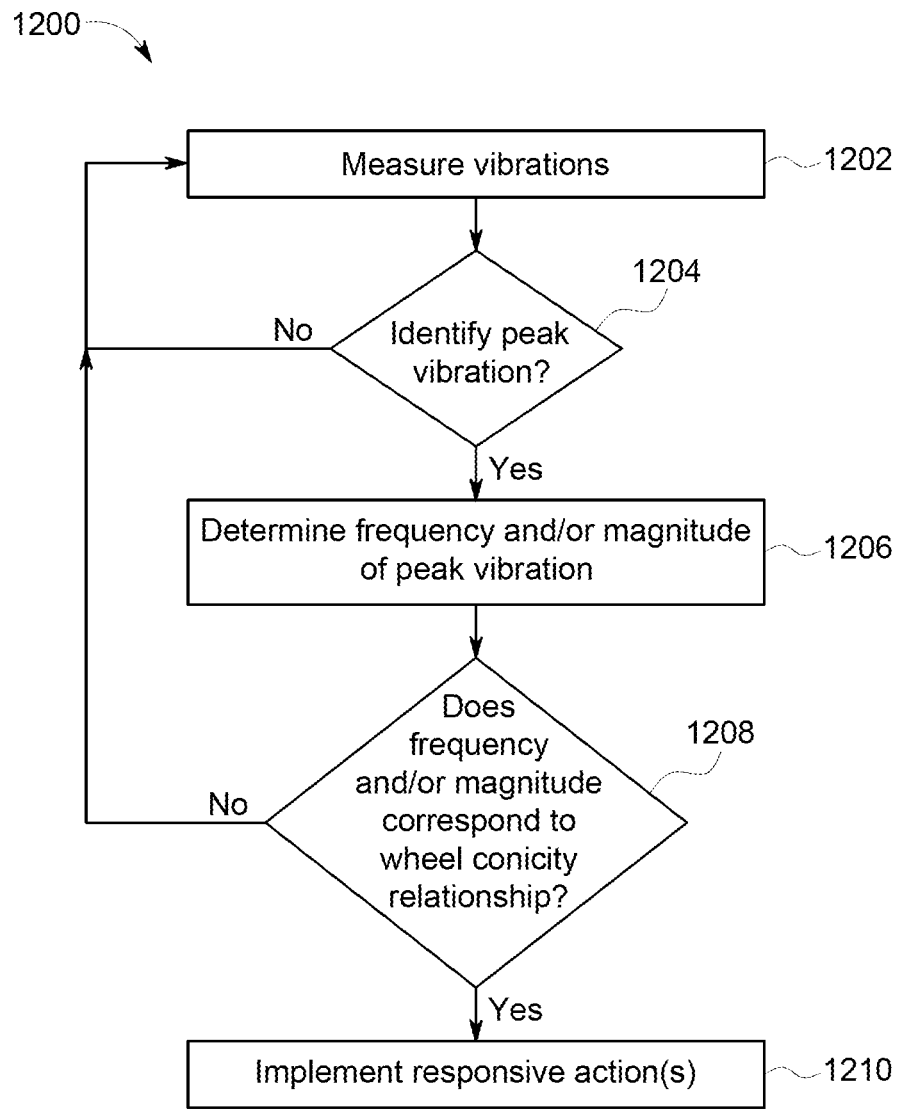
FIG. 11 illustrates a flowchart of another embodiment of a method for monitoring vibrations of a vehicle.

FIG. 11 illustrates a flowchart of another embodiment of a method 1200 for monitoring vibrations of a vehicle. The method 1200 may be performed by one or more embodiments of the sensor systems described herein in order to determine whether and/or predict when a wheel needs to be trued, such as by making the surface of the wheel that contacts the route flatter (along directions that are parallel to the axis of rotation of the wheel). At 1202, vibrations of the vehicle are measured. The vibrations may be measured by one or more sensors such as accelerometers, which may be connected with a gear case housing or other component of the propulsion system of the vehicle. Alternatively, the sensors may be in other locations.

At 1204, the vibrations are examined to determine if a peak occurs within the vibrations. In one aspect, the vibrations may be measured over a period of time and the average, median, or other statistical measure of the vibrations may be determined as a vibration signature. The vibration signature can be examined to avoid inadvertently identifying a peak as indicative of wheel conicity, as described herein. For example, examining several vibrations measured over a period of time can result in vibrations caused by wheel conicity to appear in the signature while vibrations caused by other transient efforts to be decreased or disappear. If a peak appears in the vibrations, then flow of the method 1200 can proceed toward 1206. Otherwise, flow of the method 1200 can return toward 1202.

At 1206, the frequency and/or magnitude of the peak vibration are determined. As described above, the frequency may be the hunting frequency of a wheel/axle set while the magnitude of the peak vibration may represent the lateral acceleration caused by hunting of the wheel/axle set. At 1208, a determination is made as to whether the frequency and/or magnitude correspond with a wheel conicity relationship. For example, several different relationships between the moving speed of the vehicle and/or wheel/axle set and the hunting frequency or vibration magnitude may represent different wheel conicities. If the frequency and/or magnitude of the peak vibration correspond to a relationship, then the conicity associated with the relationship may indicate the conicity of the wheel or wheels in the wheel/axle set. If the frequency and/or magnitude do correspond with a relationship, then flow of the method 1200 may proceed toward 1210. Otherwise, flow of the method 1200 can return toward 1202.

At 1206, one or more responsive actions can be implemented. If the wheel conicity that is determined is not sufficiently large to require trueing of the wheel, then the conicity may continue to be monitored to determine if the conicity is growing larger over time. If the wheel conicity changes (e.g., increases) by more than a designated, non-zero threshold amount, then a signal can be communicated to an off-board location to an off-board location, such as a repair facility, rail yard, or the like, to automatically schedule or request to schedule repair, inspection, and/or replacement of a wheel based on the conicity that is determined. Optionally, this signal may inform the off-board location of the size of wheel needed by the vehicle to replace the wheel. The off-board location may then set aside or otherwise obtain a replacement wheel for the vehicle. In doing so, the vehicle may have a replacement wheel ready for installing on the vehicle upon arrival of the vehicle at the off-board location. Optionally, the control system and/or controller may automatically change how the vehicle is operated, such as by automatically slowing movement of the vehicle, automatically restricting the control settings that an operator may use (e.g., by preventing the operator from increasing the throttle to a fast setting), etc.

In one embodiment, a system (e.g., a signal processing system) includes one or more sensors configured to sense vibrations of a vehicle, and one or more processors configured to determine an operational speed of the vehicle and one or more frequencies of interest based on the operational speed of the vehicle. The one or more processors also are configured to determine whether the vibrations occurring at the one or more frequencies of interest indicate damage to a propulsion system of the vehicle.

Optionally, the one or more sensors include one or more accelerometers configured to be coupled with the propulsion system of the vehicle.

Optionally, the one or more processors are configured to determine a rotational speed of a wheel of the vehicle as the operational speed of the vehicle.

Optionally, the one or more frequencies of interest represent the rotational speed of the wheel of the vehicle.

Optionally, the one or more processors are configured to determine the vibrations as indicating damage to the propulsion system responsive to the vibrations occurring at the one or more frequencies that represent the rotational speed of the wheel and a magnitude of the vibrations at the one or more frequencies of interest being larger than a magnitude of the vibrations at one or more frequencies other than the one or more frequencies of interest.

Optionally, the one or more processors are configured to determine a rotational speed of meshing gears of the vehicle as the operational speed of the vehicle.

Optionally, the one or more frequencies of interest represent the rotational speed of the meshing gears of the vehicle.

Optionally, the vibrations are determined by the one or more processors as indicating damage to one or more of a bearing, axle, or motor of the propulsion system responsive to the vibrations occurring at the one or more frequencies that represent the rotational speed of the meshing gears and a magnitude of the vibrations at the one or more frequencies of interest is larger than a magnitude of one or more vibrations at one or more frequencies other than the one or more frequencies of interest.

Optionally, the one or more processors are configured to direct a communication system to communicate a signal to an off-board location to automatically schedule or request to schedule one or more of repair, inspection, or replacement of one or more of a wheel or component of the propulsion system of the vehicle based on the vibrations.

In one embodiment, a system includes one or more sensors configured to measure vibrations of a vehicle, and one or more processors configured to determine a moving speed of the vehicle along a route. The one or more processors also are configured to determine one or more of a hunting frequency or a lateral acceleration of a wheel and axle set from the vibrations. The one or more processors are configured to determine a conicity of a wheel in the wheel and axle set based on the one or more of the hunting frequency or the lateral acceleration that is determined.

Optionally, the one or more sensors include one or more accelerometers configured to be coupled with a gear box housing having a traction motor that rotates an axle of the wheel and axle set to rotate the wheel.

Optionally, the one or more processors are configured to determine the one or more of the hunting frequency or the lateral acceleration by identifying a peak vibration in the vibrations that are measured and identifying one or more of a frequency at which the peak vibration occurs as the hunting frequency or a magnitude of the peak vibration as the lateral acceleration.

Optionally, the hunting frequency represents a frequency at which the wheel and axle set laterally moves back-and-forth on the route in directions that are transverse to a direction of movement of the vehicle on the route.

Optionally, the lateral acceleration represents acceleration of the wheel and axle set in one or more directions that are transverse to a direction of movement of the vehicle on the route.

Optionally, the one or more processors are configured to determine the conicity of the wheel by comparing one or more of the moving speed of the vehicle, the hunting frequency, or the lateral acceleration to one or more relationships between the moving speed of the vehicle and one or more of the hunting frequency or the lateral acceleration, wherein the one or more relationships are associated with different conicities of the wheel.

In one embodiment, a method includes sensing vibrations of a vehicle using at least one sensor, determining an operational speed of the vehicle and one or more frequencies of interest based on the operational speed of the vehicle, and determining that the vibrations occurring at the one or more frequencies of interest indicate damage to a propulsion system of the vehicle.

Optionally, the vibrations are sensed using the at least one sensor that includes one or more accelerometers coupled with the propulsion system of the vehicle.

Optionally, the operational speed of the vehicle that is determined is a rotational speed of one or more of a wheel of the vehicle or meshing gears of the vehicle.

Optionally, the one or more frequencies of interest represent the rotational speed of the vehicle.

Optionally, the method also includes communicating a signal to an off-board location to automatically schedule or request to schedule one or more of repair, inspection, or replacement of one or more of a wheel or component of the propulsion system of the vehicle based on the vibrations.

In one embodiment, a method (e.g., for monitoring vibrations of a vehicle) includes sensing vibrations of a vehicle using a sensor, determining a speed of the vehicle, and determining whether the vibrations occurring at one or more frequencies of interest that are based on the speed of the vehicle indicate damage to a propulsion system of the vehicle.

Optionally, the vibrations can be sensed using one or more accelerometers coupled with the propulsion system of the vehicle.

Optionally, the speed of the vehicle that is determined can be a rotational speed of a wheel of the vehicle.

Optionally, the one or more frequencies of interest can represent the rotational speed of the wheel of the vehicle.

Optionally, the vibrations can be determined responsive to the vibrations occurring at the one or more frequencies that represent the rotational speed of the wheel and a magnitude of the vibrations at the one or more frequencies of interest is increased relative to other frequencies.

Optionally, the speed of the vehicle that is determined can be a rotational speed of meshing gears of the vehicle.

Optionally, the one or more frequencies of interest can represent the rotational speed of the meshing gears of the vehicle.

Optionally, the vibrations are determined responsive to the vibrations occurring at the one or more frequencies that represent the rotational speed of the meshing gears and a magnitude of the vibrations at the one or more frequencies of interest is increased relative to other frequencies.

Optionally, the method also can include communicating a signal to an off-board location to automatically schedule or request to schedule one or more of repair, inspection, and/or replacement of one or more of a wheel or component of the propulsion system of the vehicle based on the vibrations.

In one embodiment, a system (e.g., a sensor system) includes one or more sensors configured to sense vibrations of a vehicle and one or more processors configured to determine a speed of the vehicle and determine whether the vibrations occurring at one or more frequencies of interest that are based on the speed of the vehicle indicate damage to a propulsion system of the vehicle.

Optionally, the one or more sensors can include one or more accelerometers configured to be coupled with the propulsion system of the vehicle.

Optionally, the one or more processors are configured to determine the speed of the vehicle as a rotational speed of a wheel of the vehicle.

Optionally, the one or more frequencies of interest can represent the rotational speed of the wheel of the vehicle.

Optionally, the one or more processors can be configured to determine the vibrations as indicating damage to the propulsion system responsive to the vibrations occurring at the one or more frequencies that represent the rotational speed of the wheel and a magnitude of the vibrations at the one or more frequencies of interest is increased relative to other frequencies.

Optionally, the speed of the vehicle that is determined by the one or more processors can be a rotational speed of meshing gears of the vehicle.

Optionally, the one or more frequencies of interest can represent the rotational speed of the meshing gears of the vehicle.

Optionally, the vibrations can be determined by the one or more processors as indicating damage to one or more of a bearing, axle, or motor of the propulsion system responsive to the vibrations occurring at the one or more frequencies that represent the rotational speed of the meshing gears and a magnitude of the vibrations at the one or more frequencies of interest is increased relative to other frequencies.

Optionally, the one or more processors can be configured to direct a communication system to communicate a signal to an off-board location to automatically schedule or request to schedule one or more of repair, inspection, and/or replacement of one or more of a wheel or component of the propulsion system of the vehicle based on the vibrations.

In one embodiment, a method (e.g., for monitoring vibrations of a vehicle) includes measuring vibrations of a vehicle using one or more sensors, determining a moving speed of the vehicle along the route, determining one or more of a hunting frequency of a wheel and axle set or a lateral acceleration of the wheel and axle set from the vibrations, and determining a conicity of a wheel in the wheel and axle set based on the one or more of the hunting frequency or the lateral acceleration that is determined.

Optionally, the vibrations can be measured using one or more accelerometers coupled with a gear box housing in which a traction motor that rotates an axle of the wheel and axle set to rotate the wheel is disposed.

Optionally, the moving speed that is determined can be a velocity of the vehicle along a path of the route.

Optionally, the one or more of the hunting frequency or the lateral acceleration can be determined by identifying a peak vibration in the vibrations that are measured and identifying one or more of a frequency at which the peak vibration occurs as the hunting frequency or a magnitude of the peak vibration as the lateral acceleration.

Optionally, the hunting frequency can represent a frequency at which the wheel and axle set laterally moves back-and-forth on the route in directions that are transverse to a direction of movement of the vehicle on the route.

Optionally, the lateral acceleration can represent acceleration of the wheel and axle set in one or more directions that are transverse to a direction of movement of the vehicle on the route.

Optionally, determining the conicity of the wheel can include comparing one or more of the moving speed of the vehicle, the hunting frequency, and/or the lateral acceleration to one or more relationships between the moving speed of the vehicle and one or more of the hunting frequency or the lateral acceleration, wherein the one or more relationships are associated with different conicities of the wheel.

In one embodiment, a system (e.g., a sensor system) includes one or more sensors configured to measure vibrations of a vehicle using one or more sensors and one or more processors configured to determine a moving speed of the vehicle along the route, determine one or more of a hunting frequency of a wheel and axle set or a lateral acceleration of the wheel and axle set from the vibrations, and determine a conicity of a wheel in the wheel and axle set based on the one or more of the hunting frequency or the lateral acceleration that is determined.

Optionally, the one or more sensors can include one or more accelerometers configured to be coupled with a gear box housing in which a traction motor that rotates an axle of the wheel and axle set to rotate the wheel is disposed.

Optionally, the moving speed that is determined can be a velocity of the vehicle along a path of the route.

Optionally, the one or more processors can be configured to determine the one or more of the hunting frequency or the lateral acceleration by identifying a peak vibration in the vibrations that are measured and identifying one or more of a frequency at which the peak vibration occurs as the hunting frequency or a magnitude of the peak vibration as the lateral acceleration.

Optionally, the hunting frequency can represent a frequency at which the wheel and axle set laterally moves back-and-forth on the route in directions that are transverse to a direction of movement of the vehicle on the route.

Optionally, the lateral acceleration can represent acceleration of the wheel and axle set in one or more directions that are transverse to a direction of movement of the vehicle on the route.

Optionally, the one or more processors can be configured to determine the conicity of the wheel by comparing one or more of the moving speed of the vehicle, the hunting frequency, and/or the lateral acceleration to one or more relationships between the moving speed of the vehicle and one or more of the hunting frequency or the lateral acceleration. The one or more relationships can be associated with different conicities of the wheel.

In one embodiment, a method (e.g., for monitoring vibrations of a vehicle) includes measuring vibrations of a drive train of a vehicle using a sensor, determining one or more frequencies at which one or more peaks occur in a frequency domain spectra of the vibrations that are measured, and determining a speed at which a wheel of the vehicle rotates based on the one or more frequencies that are determined.

Optionally, the one or more frequencies at which the one or more peaks occur can represent the vibrations caused by meshing of gears in the drive train.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the clauses, and may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
    sensors configured to measure characteristics of a vehicle, at least a first characteristic of the characteristics representative of vibrations of the vehicle and at least second characteristic of the characteristics representative of a moving speed of the vehicle, the sensors configured to output data indicative of the vibrations of the vehicle and of the moving speed of the vehicle; and
    one or more processors configured to receive the data indicative of the vibrations of the vehicle and of the moving speed of the vehicle from the sensors, the one or more processors configured to identify a peak vibration of the vibrations, wherein the peak vibration is the vibration with the largest magnitude in the frequency domain, the one or more processors also configured to determine a lateral acceleration of a wheel and axle set based on the data,
    wherein the one or more processors are configured to determine a conicity of a wheel in the wheel and axle set by comparing the lateral acceleration that is determined from the data indicative of the vibrations of the vehicle, and the moving speed of the vehicle with conicity relationships between lateral accelerations and moving speeds, the conicity relationships associated with different wheel conicities,
    wherein the one or more processors are configured to implement a responsive action responsive to determining that the conicity of the wheel in the wheel and axle set exceeds a designated threshold amount; and
    wherein the one or more processors are configured to determine a hunting frequency of the wheel and axle set that represents a frequency at which the wheel and axle set laterally moves back-and-forth on the route in a direction that is transverse to a direction of movement of the vehicle on the route, wherein the one or more processors are configured to determine the hunting frequency based on the moving speed of the vehicle and the peak vibration of the vibrations.

2. The system of claim 1, wherein the sensors include one or more accelerometers configured to be coupled with a gear box housing having a traction motor that rotates an axle of the wheel and axle set to rotate the wheel.

3. The system of claim 1, wherein the one or more processors are configured to determine the lateral acceleration based on a magnitude of a peak vibration in the vibrations that are measured.

4. The system of claim 1, wherein the vehicle is a locomotive and the route is a track, wherein the vehicle locomotive is configured to move along the track.

5. The system of claim 1, wherein the one or more processors are configured to control movement of the vehicle.

6. The system of claim 5, wherein the one or more processors are configured to change movement of the vehicle responsive to determining that the conicity of the wheel in the wheel and axle set exceeds the designated threshold amount.

7. The system of claim 5, wherein the sensors include one or more accelerometers configured to be coupled with a gear box housing having a traction motor that rotates an axle of the wheel and axle set to rotate the wheel.

8. The system of claim 5, wherein the one or more processors are configured to determine the hunting frequency also based on the moving speed of the vehicle.

9. The system of claim 5, wherein the one or more processors are configured to determine the conicity of the wheel by comparing the moving speed of the vehicle and the lateral acceleration to relationships between moving speeds of the vehicle and lateral accelerations associated with different conicities of the wheel.

10. The system of claim 5, wherein the vehicle is configured to travel along a track.

11. The system of claim 5, wherein the one or more processors are configured to direct a communication system to communicate a signal to an off-board location to automatically schedule or request to schedule one or more of repair, inspection, or replacement of the wheel in the wheel and axle set responsive to determining that the conicity of the wheel in the wheel and axle set exceeds a designated threshold amount.

12. The system of claim 1, wherein the one or more processors are configured to direct a communication system to communicate a signal to an off-board location to automatically schedule or request to schedule one or more of repair, inspection, or replacement of the wheel in the wheel and axle set responsive to determining that the conicity of the wheel in the wheel and axle set exceeds the designated threshold amount.

13. The system of claim 1, wherein the one or more processors are configured to determine a hunting frequency of the wheel and axle set that represents a frequency at which the wheel and axle set laterally moves back-and-forth on a route in a direction that is transverse to a direction of movement of the vehicle on the route, wherein the one or more processors are configured to determine the hunting frequency from the following equation:

$$\omega = V \sqrt{\frac{\delta_0}{(e_0 r_0)}}$$

where $\omega$ represents the hunting frequency, V represents the moving speed of the vehicle or the wheel and axle set, $\delta_0$ represents an average of the conicities of wheels in the wheel/axle set, $e_0$ represents a contact distance of the wheel and axle set, and $r_0$ represents an average of radii of the wheels in the wheel/axle set.

14. A system comprising:
sensors configured to measure vibrations of a vehicle and a moving speed of the vehicle, the one or more sensors configured to output data indicative of the vibrations and of the moving speed; and
one or more processors configured to receive the data from the sensors and to identify a peak vibration of the vibrations from the data, wherein the peak vibration is the vibration with the largest magnitude in the frequency domain, the one or more processors also configured to determine a hunting frequency and a lateral acceleration of a wheel and axle set from the peak vibration of the vibrations, wherein the one or more processors are configured to determine a conicity of a wheel in the wheel and axle set based on the moving speed of the vehicle and one or more of the hunting frequency determined from the peak vibration of the vibrations or the lateral acceleration that is determined from the peak vibration of the vibrations, and wherein the one or more processors are configured to change movement of the vehicle responsive to determining that the conicity of the wheel in the wheel and axle set exceeds a designated threshold amount.

15. A system comprising:
sensors configured to measure vibrations of a vehicle, the one or more sensors configured to output data indicative of the vibrations; and
one or more processors configured to receive the data from the sensors and to identify a peak vibration of the vibrations from the data, wherein the peak vibration is the vibration with the largest magnitude in the frequency domain,
wherein the one or more processors are configured to determine a hunting frequency and a lateral acceleration of a wheel and axle set from the peak vibration of the vibrations.

16. The system of claim 15, wherein the one or more processors are configured to determine a conicity of a wheel in the wheel and axle set based on the moving speed of the vehicle and one or more of the hunting frequency determined from the peak vibration of the vibrations or the lateral acceleration that is determined from the peak vibration of the vibrations.

17. The system of claim 16, wherein the one or more processors are configured to change movement of the vehicle responsive to determining that the conicity of the wheel in the wheel and axle set exceeds a designated threshold amount.

18. The system of claim 15, wherein the sensors include one or more accelerometers configured to be coupled with a gear box housing having a traction motor that rotates an axle of the wheel and axle set to rotate the wheel.

19. The system of claim 15, wherein the one or more processors are configured to direct a communication system to communicate a signal to an off-board location to automatically schedule or request to schedule one or more of repair, inspection, or replacement of the wheel in the wheel and axle set responsive to determining that the conicity of the wheel in the wheel and axle set exceeds a designated threshold amount.

20. The system of claim 15, wherein the vehicle is configured to travel along a track.

* * * * *